United States Patent
Ramaswamy et al.

(10) Patent No.: US 11,799,088 B2
(45) Date of Patent: Oct. 24, 2023

(54) FUEL CELL CATHODE AND FUEL CELL SYSTEM INCLUDING A POLYMERIC ADDITIVE

(71) Applicant: GM GLOBAL TECHNOLOGY OPERATIONS LLC, Detroit, MI (US)

(72) Inventors: Nagappan Ramaswamy, Rochester Hills, MI (US); Roland J. Koestner, Rochester Hills, MI (US); Swaminatha P. Kumaraguru, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 11 days.

(21) Appl. No.: 17/573,089

(22) Filed: Jan. 11, 2022

(65) Prior Publication Data
US 2023/0223552 A1    Jul. 13, 2023

(51) Int. Cl.
*H01M 4/86* (2006.01)
*H01M 4/88* (2006.01)

(52) U.S. Cl.
CPC ....... *H01M 4/8657* (2013.01); *H01M 4/8663* (2013.01); *H01M 4/8828* (2013.01); *H01M 4/8885* (2013.01); *H01M 2004/8689* (2013.01)

(58) Field of Classification Search
CPC ............. H01M 4/8657; H01M 4/8663; H01M 4/8828; H01M 4/8885; H01M 2004/8689
See application file for complete search history.

(56) References Cited

U.S. PATENT DOCUMENTS

| | | | |
|---|---|---|---|
| 2004/0131906 A1* | 7/2004 | Ovshinsky | C01B 13/02 429/223 |
| 2005/0255373 A1* | 11/2005 | Kimura | H01M 8/0243 429/530 |
| 2007/0134545 A1* | 6/2007 | Deng | H01M 8/1004 429/530 |
| 2008/0070777 A1* | 3/2008 | Jang | H01M 4/8807 429/494 |
| 2009/0239118 A1* | 9/2009 | Morita | H01M 4/86 429/483 |
| 2011/0008706 A1* | 1/2011 | Cipollini | H01M 4/8892 429/483 |

* cited by examiner

*Primary Examiner* — Victoria H Lynch
(74) *Attorney, Agent, or Firm* — Quinn IP Law

(57) ABSTRACT

A cathode configured for use within a fuel cell system is provided. The cathode includes a cathode substrate. The cathode further includes a coating disposed upon the cathode substrate and including a fluorocarbon polymer additive configured for sintering at a temperature of less than 200° C. The fluorocarbon polymer additive may be mixed with a catalyst ink coating or may be applied separately as a topcoat layer.

20 Claims, 4 Drawing Sheets

FUEL CELL CATHODE AND FUEL CELL SYSTEM INCLUDING A POLYMERIC ADDITIVE

STATEMENT REGARDING FEDERALLY SPONSORED RESEARCH

This invention was made with Government support under Contract No. US; DE-EE0008821; HD Truck MEA awarded by the Department of Energy. The Government has certain rights in the invention.

INTRODUCTION

The disclosure generally relates to a fuel cell cathode and a fuel cell system including a polymeric additive.

A fuel cell is an electrochemical device generally composed of multiple anode electrodes that receive hydrogen ($H_2$), multiple cathode electrodes that receive oxygen ($O_2$), and multiple electrolytes or an electrolyte solution interposed between each anode and cathode. An electrochemical reaction is induced to oxidize hydrogen molecules at the anode to generate free protons (H+), which are then passed through the electrolyte for reduction at the cathode with an oxidizing agent, such as oxygen. This reaction creates electrons at the anode, some of which are redirected through a load, such as a vehicle's traction motor or a non-vehicular load requiring stationary power generation, before being sent to the cathode. Such a fuel cell can be used in combination with other fuel cells to form a fuel cell stack. This stack of fuel cells or fuel cell stack can be electrically connected to each other, for example, in series, such that the voltage supplied by each fuel cell is added to the next, such that a total voltage supplied by the fuel cell stack is the sum of the voltages of each of the stacked fuel cells.

Hybrid electric and full electric (collectively "electric-drive") powertrains take on various architectures, some of which utilize a fuel cell system to supply power for one or more electric traction motors.

SUMMARY

A cathode configured for use within a fuel cell system is provided. The cathode includes a cathode substrate. The cathode further includes a coating disposed upon the cathode substrate and including a fluorocarbon polymer additive configured for sintering at a temperature of less than 200° C.

In some embodiments, the fluorocarbon polymer additive is configured for sintering at less than 150° C.

In some embodiments, the coating further includes a catalyst ink. The catalyst ink and the fluorocarbon polymer additive are mixed together prior to being disposed upon the cathode substrate.

In some embodiments, the coating includes a first coating configured as a topcoat layer. The cathode further includes a second coating including a catalyst ink. The second coating is disposed between the cathode substrate and the first coating.

In some embodiments, the fluorocarbon polymer additive is an amorphous polytetrafluoroethylene copolymer with fluorinated alicyclic monomers.

In some embodiments, the amorphous polytetrafluoroethylene copolymer with the fluorinated alicyclic monomers is selected from the group including tetrafluoroethylene, 4,5-difluoro-2,2-bis(trifluoromethyl)-1,3dioxole, and 2,2-bistrifluoromethyl-4,5-difluoro-1,3 dioxole.

In some embodiments, the fluorocarbon polymer additive is a functionalized perfluoropolyether.

In some embodiments, the functionalized perfluoropolyether is selected from the group including a triethoxysilane terminated bifunctional perfluoropolyether; a diphosphate derivative based on a linear perfluoropolyether backbone; and a waterborne dispersion of an anionic polyurethane based on a perfluoropolyether backbone.

In some embodiments, the fluorocarbon polymer additive is a polyvinylidene fluoride semicrystalline copolymer.

In some embodiments, the polyvinylidene fluoride semicrystalline copolymer is selected from the group including of a vinylidene fluoride, a polyvinylidene fluoride: hexafluoro propylene copolymer latex, and a semicrystalline polyvinylidene fluoride: tetrafluoroethylene copolymer.

According to one alternative embodiment, a fuel cell system is provided. The fuel cell system includes an anode, a cathode, and a fuel cell membrane disposed between the anode and the cathode. The cathode includes a cathode substrate and a coating disposed upon the cathode substrate. The coating includes a fluorocarbon polymer additive configured for sintering at a temperature of less than 200° C.

In some embodiments, the fluorocarbon polymer additive is configured for sintering at less than 150° C.

In some embodiments, the coating further includes a catalyst ink. The catalyst ink and the fluorocarbon polymer additive are mixed together prior to being disposed upon the cathode substrate.

In some embodiments, the coating includes a first coating configured as a topcoat layer. The cathode further includes a second coating including a catalyst ink. The second coating is disposed between the cathode substrate and the first coating.

In some embodiments, the fluorocarbon polymer additive is an amorphous polytetrafluoroethylene copolymer with fluorinated alicyclic monomers.

In some embodiments, the fluorocarbon polymer additive is a functionalized perfluoropolyether.

In some embodiments, the fluorocarbon polymer additive is a polyvinylidene fluoride semicrystalline copolymer.

According to one alternative embodiment, a vehicle is provided. The vehicle includes a powertrain system and a fuel cell system configured for providing electrical energy to the powertrain system. The fuel cell system includes an anode, a cathode, and a fuel cell membrane disposed between the anode and the cathode. The cathode includes a cathode substrate and a coating disposed upon the cathode substrate. The coating includes a fluorocarbon polymer additive configured for sintering at a temperature of less than 200° C.

In some embodiments, the coating further includes a catalyst ink. The catalyst ink and the fluorocarbon polymer additive are mixed together prior to being disposed upon the cathode substrate.

In some embodiments, the coating includes a first coating configured as a topcoat layer. The cathode further includes a second coating including a catalyst ink. The second coating is disposed between the cathode substrate and the first coating.

The above features and advantages and other features and advantages of the present disclosure are readily apparent from the following detailed description of the best modes for carrying out the disclosure when taken in connection with the accompanying drawings.

DETAILED DESCRIPTION

Figure 1:
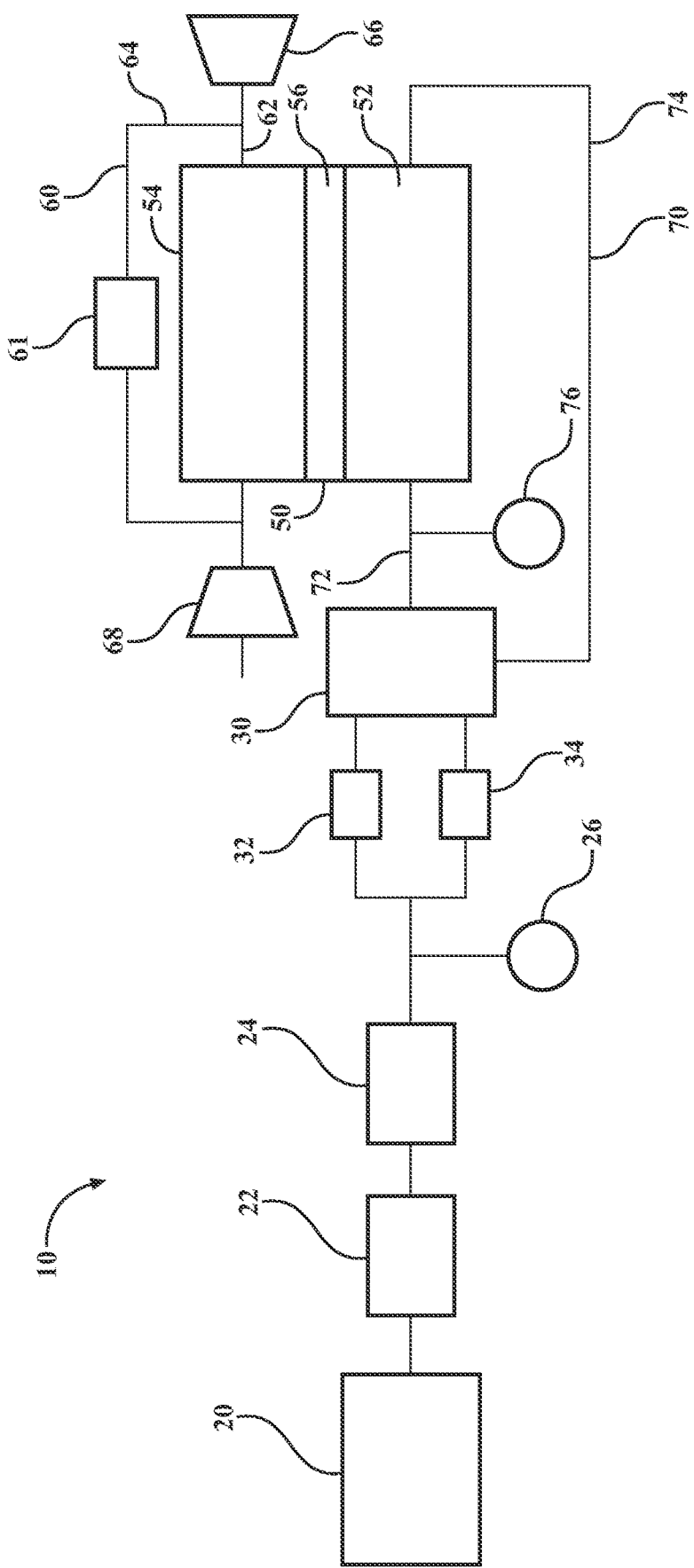
FIG. 1 schematically illustrates an exemplary fuel cell system including a fuel cell, in accordance with the present disclosure.

Fuel cell cathode substrates may experience challenges such as decreased catalyst electrochemical surface area (ECSA) which may result in decreased mass activity and cell voltage. The disclosure generally relates to the addition of fluorocarbon polymer to the cathode in a fuel cell system for excellent durability where a composition is provided to enable a low-temperature sinter process.

A fuel cell cathode including a polymer additive is disclosed. Some fuel cell cathode substrates may involve the dispersion of carbon supported platinum/platinum-cobalt catalyst nanoparticles along with ionomers that act both as a binder and proton conducting additive. According to the present disclosure, fluoropolymer materials may be utilized as an additional ingredient in the cathode substrate structure. In a first example, the fluorocarbon polymer may include an amorphous polytetrafluoroethylene (PTFE) copolymer with fluorinated alicyclic monomers that have a relatively lower sinter temperature ($T_{glass}$<200° C.) as compared to the semicrystalline homopolymer ($T_{melt}$~335° C.). An exemplary sintering process may further include a minimum temperature of 65° C. Examples of the PTFE copolymer may include tetrafluoroethylene, Hyflon® AD40 or 60 amorphous copolymer (poly(tetrafluoroethylene-co-2,2,4-trifluoro-5-trifluomethoxy-1,3-dioxole)) TFE-BDD, $T_{glass}$~90 or 125° C.), which is commercially available from Solvay Group of Brussels, Belgium, and 2,2-bistrifluoromethyl-4,5-difluoro-1,3 dioxole (BDD).

In one embodiment, the fluorocarbon polymer additive may be an amorphous fluorocarbon polymer additive. For example, the amorphous fluorocarbon polymer additive may be an amorphous PTFE copolymer with fluorinated alicyclic monomers. A plurality of amorphous PTFE copolymers with fluorinated alicyclic monomers that have a lower sinter temperature ($T_{glass}$<200° C.) than the semicrystalline homopolymer ($T_{melt}$~335° C.) are provided. A first amorphous PTFE copolymer includes tetrafluoroethylene (TFE), a semicrystalline homopolymer with a melting temperature of approximately 335° C. A second amorphous PTFE copolymer includes 4,5-difluoro-2,2-bis(trifluoromethyl)-1,3dioxole (TTD), which may be embodied by either amorphous Hyflon® AD® 40, 40% w/w TTD ($T_{glass}$~90° C.), which is commercially available from Solvay Group of Brussels, Belgium, or amorphous Hyflon® AD® 60; 60% w/w TTD ($T_{glass}$~125° C.), which is commercially available from Solvay Group of Brussels, Belgium. A third amorphous PTFE copolymer includes 2,2-bistrifluoromethyl-4,5-difluoro-1,3 dioxole (BDD), amorphous Teflon™, AF 1600; 65% w/w BDD ($T_{glass}$~160° C.) which is commercially available from the Chemours Company of Wilmington, Delaware.

In a second example, the fluorocarbon polymer may include Fluorolink® oligomers including functionalized perfluoropolyethers (PFPE), which are commercially available from Solvay Group of Brussels, Belgium. Examples include, Fluorolink® S10 (a triethoxysilane terminated, bifunctional PFPE), Fluorolink® F10 (a diphosphate derivative based on a linear PFPE backbone), Fluorolink® P56 (a waterborne dispersion of an anionic polyurethane based on a PFPE backbone).

A plurality of PFPE oligomers are provided. A first oligomer includes a Fluorolink® oligomer embodied as a modified PFPE oligomer which may be represented by the following formula (1).

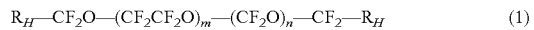

A second oligomer includes a Fluorolink® S10 trisiloxane termination which may be represented by the following formula (2).

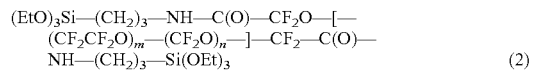

A third oligomer includes a Fluorolink® E10 ethoxylate termination which may be represented by the following formula (3).

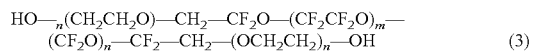

A fourth oligomer includes a Fluorolink® F10 phosphate termination.

In a third example, the fluorocarbon polymer may include a PVDF semicrystalline copolymer with a relatively lower sinter temperature (Tmelt<150° C.) than the homopolymer ($T_{melt}$~160° C.). One example includes Solef® XPH-883 or 884 PVDF-HFP copolymer latex with $T_{melt}$~100° C. or 140° C., which is commercially available from Solvay Group of Brussels, Belgium, which is a highly non-reactive semicrystalline thermoplastic fluoropolymer. The disclosed polymer additives are provided as alternatives to accomplish same or similar benefits to the fuel cell cathode. The polymer additive may provide the fuel cell with excellent durability including enhanced retention of ECSA and/or mass activity.

A plurality of polyvinylidene fluoride (PVDF) semicrystalline copolymers that have a lower sinter temperature ($T_{melt}$<150° C.) than the homopolymer ($T_{melt}$~160° C.) are provided. A first PVDF semicrystalline copolymer includes vinylidene fluoride (VDF), a semicrystalline homopolymer with a melting temperature of approximately 160° C. A second PVDF semicrystalline copolymer includes hexafluoropropylene, a semicrystalline PVDF:HFP copolymer with a lower melting temperature of from 100° C. to 150° C. (5-20% HFP w/w polymer). A third PVDF semicrystalline copolymer includes tetrafluoroethylene (TFE), a semicrystalline PVDF:TFE copolymer with a lower melting temperature of from 130° C. to 150° C. (5-20% TFE w/w polymer). A number of exemplary fluorocarbon polymer additive materials are provided herein, and a cathode substrate may be improved with any one or a plurality of any of the provided materials, in accordance with the present disclosure.

A fluorocarbon may be utilized as an additive in phosphoric acid fuel cell cathode substrate technology based on a Teflon™ structure with the chemical name polytetrafluoroethylene (PTFE). While PTFE acts as a mechanical binder and provides acceptable wet-proofing functionality to the cathode substrate structure, PTFE is not process-compatible with some fabrications of proton-exchange membrane fuel cell (PEMFC) cathode substrates. In particular, PTFE additives with $T_{melt}$~335° C. includes a thermal sintering process at temperatures in the range of 350° C.-400° C. at which point the ionomer in the PEMFC cathode substrate undergoes chemical degradation. Further, PTFE-based additives do not enable improvements in fuel cell performance and durability. The fluoropolymer additives disclosed herein utilize thermal sintering processes at temperatures below 200° C. and, in some embodiments, less than 150° C. which are thereby easily processed with the PEMFC cathode substrate coating technology.

The disclosed polymer additives may be disposed upon the cathode by direct addition to a catalyst ink prior to application to the cathode substrate coating. In another embodiment, the disclosed polymer additives may be added as a topcoat layer to the cathode substrate subsequent to coating the catalyst ink. Irrespective of the method used, the polymers are either dissolved or dispersed in a solvent that is compatible with the catalyst ink ingredients. When delivered by direct addition to a catalyst ink, the polymer additive may either be added to the ionomer premix solution prior to mixing with the dry catalyst powder or dispersed on the catalyst powder in a solvent. When delivered as a topcoat layer, the polymer additive may be delivered as a topcoat layer on the dry cathode substrate surface. The amount of polymer delivered using either of these two methods may be ≤0.4 milligrams/centimeter of the cathode substrate.

A cathode configured for use within a fuel cell system is provided with a fluorocarbon polymer additive configured for sintering at a temperature of less than 200° C. and, in some embodiments, less than 150° C. The fluorocarbon polymer additive may be added directly to the catalyst ink prior to the cathode coating. In other embodiments, the dry cathode coating is separately topcoat layered with the fluorocarbon additive layer.

In some embodiments, the fluorocarbon polymer additive includes the amorphous copolymer of tetrafluoroethylene-co-2,2,4-trifluoro-5-trifluomethoxy-1,3-dioxole composition (TFE-TTD).

In some embodiments, the fluorocarbon polymer additive includes a functionalized perfluoropolyether. In some embodiments, the functionalized oligomer includes a triethoxysilane terminated perfluoropolyether, a diphosphate terminated perfluoropolyether, or a waterborne dispersion of an anionic polyurethane based on a perfluoropolyether backbone.

In some embodiments, the fluorocarbon polymer additive includes a semicrystalline fluorocarbon polymer additive including a thermoplastic fluoropolymer containing polyvinylidene fluoride: hexafluoro propylene copolymer (PVDF: HFP).

According to one alternative embodiment, a fuel cell system is provided. The fuel cell system includes an anode and a cathode. The cathode includes a cathode substrate and a coating disposed upon the cathode substrate including a fluorocarbon polymer additive configured for sintering at a temperature of less than 200° C. and, in some embodiments, less than 150° C. The fuel cell system further includes a fuel cell membrane disposed between the anode and the cathode.

Throughout the disclosure, hydrogen gas is provided as an exemplary fuel utilized by the fuel cell system. In other embodiments, other fuels may be utilized as a reactant in the fuel cell reaction, and references to hydrogen and hydrogen gas throughout the disclosure may be replaced by any fuel that may be used as a reactant in a fuel cell.

Referring now to the drawings, wherein like reference numbers refer to like features throughout the several views, FIG. 1 schematically illustrates an exemplary fuel cell system. Fuel cell system 10 is provided for context related to an exemplary fuel cell system and is illustrated including a fuel cell stack 50, a hydrogen storage tank 20, a fuel injector 32 and a fuel injector 34 suppling flows of hydrogen gas to an ejector device 30. For simplicity, a single fuel cell is illustrated including an anode 52 and a cathode 54 separated by a fuel cell membrane 56. A fuel cell system 10 can include a plurality of fuel cell stacks 50 including a plurality of pairs of anodes 52 and cathodes 54. An anode gas loop 70 including a hydrogen gas flow is provided to the anode 52. A cathode gas subsystem 60 including a compressed air flow is provided to the cathode 54. As described herein, the fuel cell stack 50 utilizes the hydrogen gas flow at the anode 52 and the compressed air at the cathode 54 to produce electrical energy for use by the vehicle 300 of FIG. 5 or system equipped with the fuel cell stack 50.

Hydrogen gas is supplied by hydrogen storage tank 20 at high pressure. Shut-off valve 22 is provided and is capable of selectively permitting or not permitting hydrogen gas from the hydrogen storage tank 20 to flow to a remainder of the fuel cell system 10. Pressure regulator 24 is provided which controls and steps down the pressure of hydrogen gas from the high pressure delivered by hydrogen storage tank 20 to a medium pressure to be delivered to the fuel injector 32 and the fuel injector 34. A pressure sensor 26 is provided between the pressure regulator 24 and the two fuel injectors 32, 34.

The fuel injector 32 and the fuel injector 34 are operable to selectively open and supply hydrogen gas to the anode gas loop 70 and to selectively close and prohibit hydrogen gas from flowing into the anode gas loop 70. Hydrogen gas is delivered to the fuel injector 32 and the fuel injector 34 at medium pressure. The fuel injector 32 and the fuel injector 34 supply hydrogen gas to the anode gas loop 70 at a low pressure by cycling between an open state and a closed state, opening to increase pressure to a maximum desired anode gas loop pressure, closing when the pressure within the anode gas loop 70 reaches the maximum desired anode gas loop pressure, and opening again when the pressure within the anode gas loop 70 reaches a minimum desired anode gas loop pressure. By opening the fuel injector 32 and the fuel injector 34 when the pressure within the anode gas loop 70 reaches the minimum desired anode gas loop pressure and by closing the fuel injector 32 and the fuel injector 34 when the pressure within the anode gas loop 70 reaches the maximum desired anode gas loop pressure, the fuel injector 32 and the fuel injector 34 may be used to maintain the pressure within the anode gas loop 70 within a desired low pressure range.

The ejector device 30 is a device useful to provide hydrogen gas from the fuel injector 32 and from the fuel injector 34 into the anode gas loop 70. The ejector device 30 includes a venturi configuration. Hydrogen gas flowing through the ejector device 30 flows past a venturi tube within the ejector device 30. The anode gas loop 70 includes an upstream portion 72 upstream of the anode 52 and a downstream portion 74 downstream of the anode 52. The upstream portion 72 includes a high concentration of hydrogen gas. As the hydrogen gas goes through the anode 52, a significant portion of the hydrogen gas may be consumed by the anode 52. However, a lower concentration of hydrogen gas may remain in the downstream portion 74. The downstream portion 74 is connected to the venturi tube of the ejector device 30, such that the movement of hydrogen gas from the fuel injector 32 and the fuel injector 34, through the ejector device 30, and into the upstream portion 72 flows past the venturi device and draws gas from the downstream portion 74 into the gas flowing into the upstream portion 72. In this way, gas from the downstream portion 74 is recycled through the anode 52. A pressure sensor 76 is disposed to monitor a pressure within the upstream portion 72.

Water as a by-product of the chemical reaction of the fuel cell stack may exit the anode 52. The downstream portion 74 may include an anode water separator and an anode drain valve useful to drain the water from the downstream portion 74.

Air is provided to the cathode 54 to supply oxygen for the fuel cell stack reaction. An air compressor 66 is provided drawing in ambient air and providing a pressurized flow of air through a cathode gas subsystem 60. The cathode gas subsystem 60 includes a cathode reactant portion 62 and a cathode bypass portion 64. The cathode reactant portion 62 provides a flow of air to the cathode 54. A bypass valve 61 is connected to the cathode bypass portion 64, and control of the bypass valve 61 may be used to control how much air flows through the cathode bypass portion 64 and how much air flows through the cathode reactant portion 62. This control of how much air flows through the cathode reactant portion 62 may be important to controlling the reaction of the fuel cell stack 50. Air exits through an air expander device 68.

Figure 2A:
FIG. 2A schematically illustrates an exemplary cathode substrate of the fuel cell of FIG. 1 including a catalyst ink layer including a fluorocarbon polymer additive, in accordance with the present disclosure.

FIG. 2A schematically illustrates an exemplary cathode substrate 54 of a fuel cell including a catalyst ink layer 55 including a fluorocarbon polymer additive. The fluorocarbon polymer additive may be added to the catalyst ink prior to the catalyst ink being applied to the cathode substrate 54.

Figure 2B:
FIG. 2B schematically illustrates an exemplary cathode substrate of the fuel cell of FIG. 1 including a catalyst ink layer and a topcoat layer including a fluorocarbon polymer additive, in accordance with the present disclosure.

FIG. 2B schematically illustrates an exemplary cathode substrate 54 of a fuel cell including a catalyst ink layer 57 and a topcoat layer 59 including a fluorocarbon polymer additive. The catalyst ink layer 57 may be applied to the cathode substrate 54 and may be permitted to dry or cure prior to an addition of the topcoat layer 59.

Figure 3:
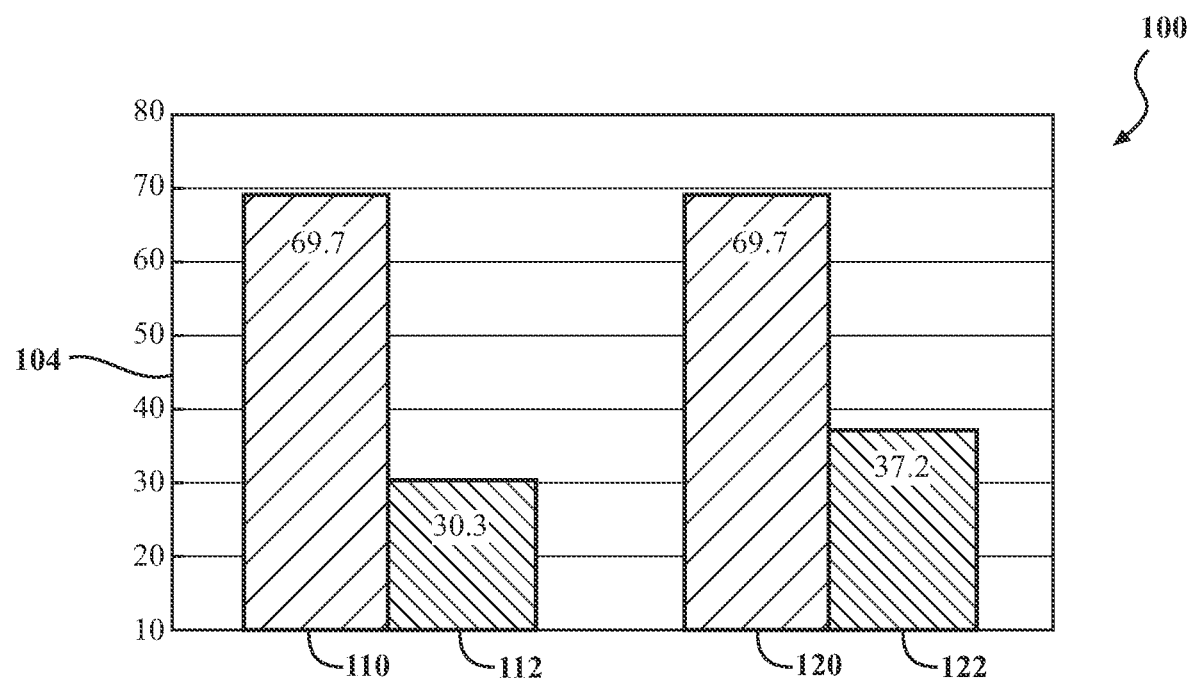
FIG. 3 graphically illustrates a change in catalyst electrochemical surface area (ECSA) through cyclic testing for both a baseline fuel cell cathode substrate and a fuel cell cathode substrate including the disclosed fluorocarbon polymer additive, in accordance with the present disclosure.

FIG. 3 graphically illustrates a change in catalyst electrochemical surface area (ECSA) through cyclic testing for both a comparative baseline fuel cell cathode substrate and a fuel cell cathode substrate including the disclosed fluorocarbon polymer additive. In particular, the test sample uses the direct addition of two fluorocarbon polymers to the ionomer premix solution for the cathode coating. In particular, an amorphous Hyflon® AD40 copolymer is received as a 9% w/w solution in PFPE solvent and dispersed in the PFSA ionomer premix solution using a Thinky® ARE-310 centrifugal mixer to give an oil emulsion at 1.5% w/w PFSA. The Fluorolink® P56 is received as a 25% w/w solids dispersion in water solvent and added directly to the ionomer premix solution for another additive loading at 1.5% w/w PFSA. The resulting cathode substrate coating is dried at 40° C. under an IR lamp and then sintered at 150° C. for 10 minutes in a convective oven purged with inert $N_2$ gas.

Graph 100 of FIG. 3 is illustrated including a vertical axis 104 illustrating an ECSA value for a cathode substrate in meters$^2$/gram. A horizontal axis includes four different samples: sample 110, an initial comparative baseline sample; sample 112, the comparative baseline sample after the cycling test; sample 120, an initial sample including the amorphous fluorocarbon polymer additive; and sample 122, the sample including the fluorocarbon polymer additive after the cycling test. Comparing sample 110 to sample 112, one may see degradation of the cathode substrate from an initial ECSA value of 69.7 meters$^2$/gram to 30.3 meters$^2$/gram. Comparing sample 120 to sample 122, one may see degradation of the cathode substrate from an initial ECSA value of 69.7 meters$^2$/gram to 37.2 meters$^2$/gram. The addition of the fluorocarbon polymer additive improved durability and performance of the cathode substrate by providing excellent electrochemical surface area retention.

Figure 4:
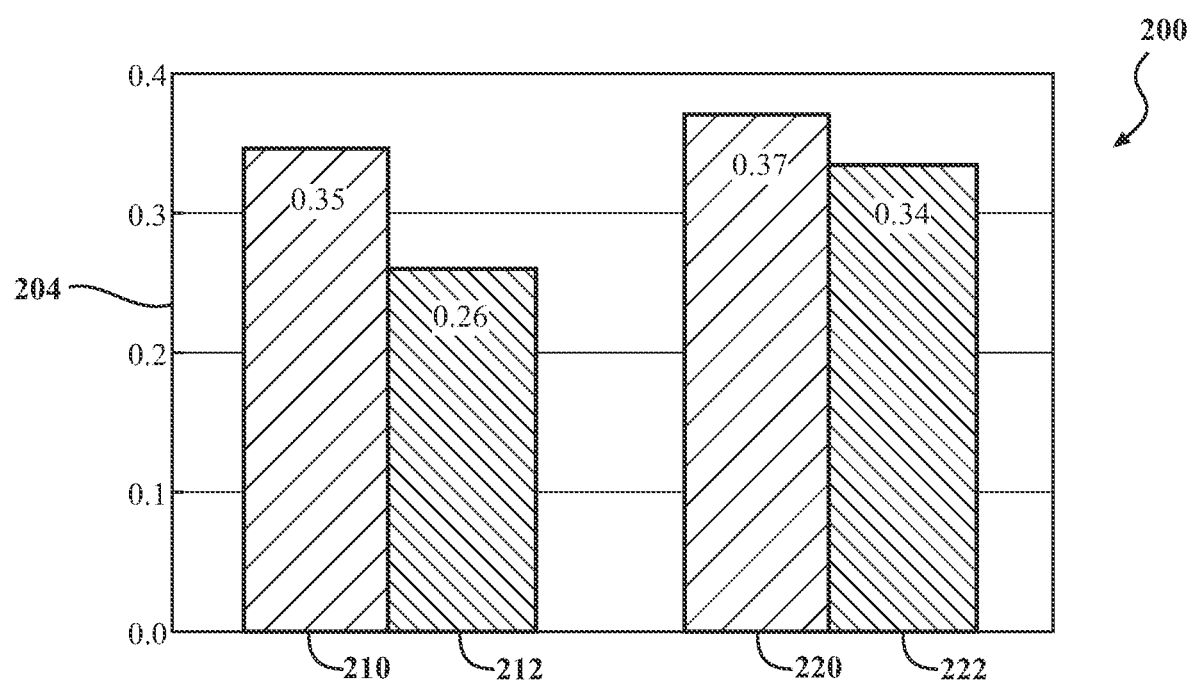
FIG. 4 graphically illustrates a change in mass activity through cyclic testing for both a baseline fuel cell cathode substrate and a fuel cell cathode substrate including the disclosed fluorocarbon polymer additive, in accordance with the present disclosure.

FIG. 4 graphically illustrates a change in mass activity through cyclic testing for both a comparative baseline fuel cell cathode substrate and a fuel cell cathode substrate including the disclosed fluorocarbon polymer additive. Mass activity may be described as current per unit of mass or current density at a specified voltage normalized to an active material mass loading. In particular, the test sample including the amorphous fluorocarbon polymer additive included a mixture of Hyflon® and Fluorolink® P56 additives. Graph 200 is illustrated including a vertical axis 204 illustrating a mass activity value for a cathode substrate in Amperes/milligram of platinum. A horizontal axis includes four different samples from the test: sample 210, an initial comparative baseline sample; sample 212, the comparative baseline sample after the cycling test; sample 220, an initial sample including the fluorocarbon polymer additive; and sample 222, the sample including the fluorocarbon polymer additive after the cycling test. Comparing sample 210 to sample 212, one may see a decreased initial mass activity value of 0.35 Amperes per milligram of platinum to 0.26 Amperes per milligram of platinum. Comparing sample 220 to sample 222, one may see a decreased initial mass activity value of 0.37 Amperes per milligram of platinum to 0.34 Amperes per milligram of platinum. The addition of the fluorocarbon polymer additive improved durability and performance of the cathode substrate by providing excellent mass activity retention.

The benefits of the disclosed additives include lower degradation of the catalyst electrochemical surface area which results in improved mass activity, and cell voltage performance over lifetime.

Figure 5:
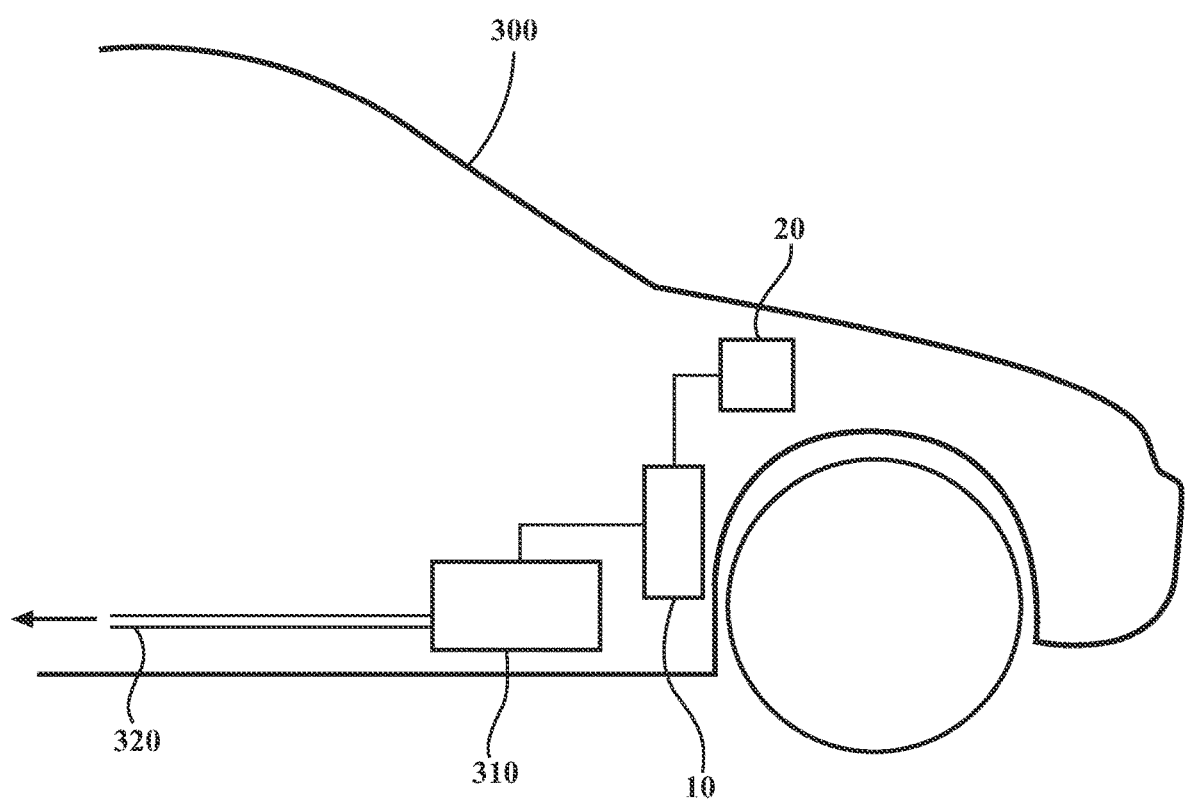
FIG. 5 schematically illustrates an exemplary vehicle equipped with the fuel cell system of FIG. 1, in accordance with the present disclosure.

The disclosed fuel cell system 10 of FIG. 1 may be utilized within a wide variety of applications. The fuel cell system 10 FIG. 1 may be utilized in a powertrain system useful to produce an output torque upon an output shaft. FIG. 5 schematically illustrates an exemplary vehicle 300 equipped with the fuel cell system 10 of FIG. 1. The vehicle 300 is illustrated including the hydrogen storage tank 20, the fuel cell system 10, a powertrain system 310, and an output shaft 320. Hydrogen fuel is supplied from the hydrogen storage tank 20 to the fuel cell system 10. The fuel cell system 10 includes a cathode including a coating including an amorphous fluorocarbon polymer additive as disclosed herein. The fuel cell system 10 generates electrical energy which is supplied to the powertrain system 310. The powertrain system 310 may include a battery or other energy storage device useful to store electrical energy supplied by the fuel cell system 10. The powertrain system 310 utilizes electrical energy to create an output torque upon an output shaft 320 which may be utilized to provide motive force to the vehicle 300.

A cathode configured for use within a fuel cell system is provided. The cathode includes a cathode substrate. The cathode further includes a coating disposed upon the cathode substrate and including a fluorocarbon polymer additive configured for sintering at a temperature of less than 200° C.

The fluorocarbon polymer additive may be configured for sintering at less than 150° C.

The coating may further include a catalyst ink. The catalyst ink and the fluorocarbon polymer additive may be mixed together prior to being disposed upon the cathode substrate.

The coating may include a first coating configured as a topcoat layer. The cathode may further include a second coating including a catalyst ink. The second coating may be disposed between the cathode substrate and the first coating. That is, the second coating may be disposed between and in contact with the cathode substrate and the first coating.

The fluorocarbon polymer additive may be an amorphous polytetrafluoroethylene copolymer with fluorinated alicyclic monomers.

The amorphous polytetrafluoroethylene copolymer with the fluorinated alicyclic monomers may be selected from the group including tetrafluoroethylene, 4,5-difluoro-2,2-bis(trifluoromethyl)-1,3dioxole, and 2,2-bistrifluoromethyl-4,5-difluoro-1,3 dioxole.

The fluorocarbon polymer additive may be a functionalized perfluoropolyether.

The functionalized perfluoropolyether may be selected from the group including a triethoxysilane terminated bifunctional perfluoropolyether; a diphosphate derivative based on a linear perfluoropolyether backbone; and a waterborne dispersion of an anionic polyurethane based on a perfluoropolyether backbone.

The fluorocarbon polymer additive may be a polyvinylidene fluoride semicrystalline copolymer.

The polyvinylidene fluoride semicrystalline copolymer may be selected from the group including a vinylidene fluoride, a polyvinylidene fluoride: hexafluoro propylene copolymer latex, and a semicrystalline polyvinylidene fluoride: tetrafluoroethylene copolymer.

According to one alternative embodiment, a fuel cell system is provided. The fuel cell system includes an anode, a cathode, and a fuel cell membrane disposed between the anode and the cathode. The cathode includes a cathode substrate and a coating disposed upon the cathode substrate. The coating includes a fluorocarbon polymer additive configured for sintering at a temperature of less than 200° C.

The fluorocarbon polymer additive may be configured for sintering at less than 150° C.

The coating may further include a catalyst ink. The catalyst ink and the fluorocarbon polymer additive may be mixed together prior to being disposed upon the cathode substrate.

The coating may include a first coating configured as a topcoat layer. The cathode may further include a second coating including a catalyst ink. The second coating may be disposed between the cathode substrate and the first coating.

The fluorocarbon polymer additive may be an amorphous polytetrafluoroethylene copolymer with fluorinated alicyclic monomers.

The fluorocarbon polymer additive may be a functionalized perfluoropolyether.

The fluorocarbon polymer additive may be a polyvinylidene fluoride semicrystalline copolymer.

According to one alternative embodiment, a vehicle is provided. The vehicle includes a powertrain system and a fuel cell system configured for providing electrical energy to the powertrain system. The fuel cell system includes an anode, a cathode, and a fuel cell membrane disposed between the anode and the cathode. The cathode includes a cathode substrate and a coating disposed upon the cathode substrate. The coating includes a fluorocarbon polymer additive configured for sintering at a temperature of less than 200° C.

The coating may further include a catalyst ink. The catalyst ink and the fluorocarbon polymer additive may be mixed together prior to being disposed upon the cathode substrate.

The coating may include a first coating configured as a topcoat layer. The cathode may further include a second coating including a catalyst ink. The second coating may be disposed between the cathode substrate and the first coating.

While the best modes for carrying out the disclosure have been described in detail, those familiar with the art to which this disclosure relates will recognize various alternative designs and embodiments for practicing the disclosure within the scope of the appended claims.

What is claimed is:

1. A cathode configured for use within a fuel cell system, the cathode comprising:
   a cathode substrate; and
   a coating disposed upon the cathode substrate including a fluorocarbon polymer additive configured for sintering at a temperature of less than 200° C., wherein the cathode includes a catalyst ink, and wherein:
   the coating includes a first coating configured as a topcoat layer, the cathode further comprises a second coating that includes the catalyst ink, and the second coating is disposed between the cathode substrate and the first coating.

2. The cathode of claim 1, wherein the fluorocarbon polymer additive is configured for sintering at less than 150° C.

3. The cathode of claim 1, wherein the fluorocarbon polymer additive is an amorphous polytetrafluoroethylene copolymer with fluorinated alicyclic monomers.

4. The cathode of claim 3, wherein the amorphous polytetrafluoroethylene copolymer with the fluorinated alicyclic monomers is selected from the group consisting of tetrafluoroethylene, 4,5-difluoro-2,2-bis(trifluoromethyl)-1,3dioxole, and 2,2-bistrifluoromethyl-4,5-difluoro-1,3 dioxole.

5. The cathode of claim 1, wherein the fluorocarbon polymer additive is a functionalized perfluoropolyether.

6. The cathode of claim 5, wherein the functionalized perfluoropolyether is selected from the group consisting of a triethoxysilane terminated bifunctional perfluoropolyether; a diphosphate derivative based on a linear perfluoropolyether backbone; and a waterborne dispersion of an anionic polyurethane based on a perfluoropolyether backbone.

7. The cathode of claim 1, wherein the fluorocarbon polymer additive is a polyvinylidene fluoride semicrystalline copolymer.

8. The cathode of claim 7, wherein the polyvinylidene fluoride semicrystalline copolymer is selected from the group consisting of a vinylidene fluoride, a polyvinylidene fluoride: hexafluoro propylene copolymer latex, and a semicrystalline polyvinylidene fluoride: tetrafluoroethylene copolymer.

9. The cathode of claim 1, wherein the fluorocarbon polymer additive is configured for sintering at less than 150° C. and the fluorocarbon polymer additive is an amorphous polytetrafluoroethylene copolymer with fluorinated alicyclic monomers.

10. The cathode of claim 1, wherein the fluorocarbon polymer additive is configured for sintering at less than 150° C. and the fluorocarbon polymer additive is a functionalized perfluoropolyether.

11. The cathode of claim 1, wherein the fluorocarbon polymer additive is configured for sintering at less than 150° C. and the fluorocarbon polymer additive is a polyvinylidene fluoride semicrystalline copolymer.

12. A fuel cell system comprising:
an anode;
a cathode including:
a cathode substrate; and
a coating disposed upon the cathode substrate and including a fluorocarbon polymer additive configured for sintering at a temperature of less than 200° C., wherein the cathode includes a catalyst ink, and wherein:
the coating includes a first coating configured as a topcoat layer, the cathode further comprises a second coating that includes the catalyst ink, and the second coating is disposed between the cathode substrate and the first coating; and
a fuel cell membrane disposed between the anode and the cathode.

13. The fuel cell system of claim 12, wherein the fluorocarbon polymer additive is configured for sintering at less than 150° C.

14. The fuel cell system of claim 12, wherein the fluorocarbon polymer additive is an amorphous polytetrafluoroethylene copolymer with fluorinated alicyclic monomers.

15. The fuel cell system of claim 12, wherein the fluorocarbon polymer additive is a functionalized perfluoropolyether.

16. The fuel cell system of claim 12, wherein the fluorocarbon polymer additive is a polyvinylidene fluoride semicrystalline copolymer.

17. A vehicle comprising:
a powertrain system; and
a fuel cell system configured for providing electrical energy to the powertrain system, the fuel cell system including:
an anode;
a cathode including:
a cathode substrate; and
a coating disposed upon the cathode substrate and including a fluorocarbon polymer additive configured for sintering at a temperature of less than 200° C., wherein the cathode includes a catalyst ink, and wherein:
the coating includes a first coating configured as a topcoat layer, the cathode further comprises a second coating that includes the catalyst ink, and the second coating is disposed between the cathode substrate and the first coating; and
a fuel cell membrane disposed between the anode and the cathode.

18. The vehicle of claim 17, wherein the fluorocarbon polymer additive is an amorphous polytetrafluoroethylene copolymer with fluorinated alicyclic monomers.

19. The vehicle of claim 17, wherein the fluorocarbon polymer additive is a functionalized perfluoropolyether.

20. The vehicle of claim 17, wherein the fluorocarbon polymer additive is a polyvinylidene fluoride semicrystalline copolymer.

* * * * *